United States Patent
Benson et al.

(10) Patent No.: US 11,229,836 B2
(45) Date of Patent: Jan. 25, 2022

(54) INPUT METHOD AND APPARATUS

(71) Applicant: Sony Interactive Entertainment Inc., Tokyo (JP)

(72) Inventors: Simon Mark Benson, London (GB); Sharwin Winesh Raghoebardajal, London (GB); Patrick John Connor, London (GB)

(73) Assignee: Sony Interactive Entertainment Inc.

( * ) Notice: Subject to any disclaimer, the term of this patent is extended or adjusted under 35 U.S.C. 154(b) by 0 days.

(21) Appl. No.: 16/620,247

(22) PCT Filed: May 22, 2018

(86) PCT No.: PCT/GB2018/051373
§ 371 (c)(1),
(2) Date: Dec. 6, 2019

(87) PCT Pub. No.: WO2018/224801
PCT Pub. Date: Dec. 13, 2018

(65) Prior Publication Data
US 2020/0406131 A1 Dec. 31, 2020

(30) Foreign Application Priority Data

Jun. 7, 2017 (GB) ...................................... 1709067

(51) Int. Cl.
*A63F 13/24* (2014.01)
*A63F 13/218* (2014.01)
(52) U.S. Cl.
CPC ............ *A63F 13/24* (2014.09); *A63F 13/218* (2014.09)
(58) Field of Classification Search
None
See application file for complete search history.

(56) References Cited

U.S. PATENT DOCUMENTS

| 8,730,166 B2 * | 5/2014 | Larsen | A63F 13/218 |
| | | | 345/161 |
| 2001/0048424 A1 | 12/2001 | Lu | |

(Continued)

FOREIGN PATENT DOCUMENTS

WO 2015181525 A2 12/2015

OTHER PUBLICATIONS

International Search Report including Written Opinion for Application No. PCT/GB2018/051373, dated Jul. 16, 2018, pp. 1-14.

(Continued)

*Primary Examiner* — Jay Trent Liddle
*Assistant Examiner* — Alex P. Rada, II
(74) *Attorney, Agent, or Firm* — Lerner, David, Littenberg, Krumholz & Mentlik, LLP

(57) ABSTRACT

A controller for determining a displacement of a control stick and an applied pressure on the control stick comprises at least a first control stick, one or more sensors configured to sense a pressure applied to at least one control stick and to generate corresponding pressure information, first circuitry configured to receive displacement information associated with a physical displacement of the control stick, second circuitry configured to receive from one or more of the sensors pressure information associated with the pressure applied to the control stick, and third circuitry configured to determine the displacement of the control stick and the applied pressure on the control stick; wherein at least a first sensor is configured to sense the pressure applied when the physical displacement of the control stick reaches a displacement limit.

12 Claims, 15 Drawing Sheets

(56) References Cited

U.S. PATENT DOCUMENTS

| | | | | |
|---|---|---|---|---|
| 2003/0083131 A1* | 5/2003 | Armstrong | ............ | A63F 13/218 463/37 |
| 2005/0080495 A1 | 4/2005 | Tessier et al. | | |
| 2013/0100021 A1* | 4/2013 | Larsen | .................. | A63F 13/213 345/161 |
| 2014/0323219 A1 | 10/2014 | Osawa et al. | | |

OTHER PUBLICATIONS

Search Report for Application No. GB1709067.1, dated Sep. 20, 2017, pp. 1-6.
Exam Report for Application No. GB1709067.1, dated Feb. 13, 2020, 3 pages.
Written Opinion for European Application No. 18727403.0, dated Mar. 19, 2021, 5 pages.

* cited by examiner

INPUT METHOD AND APPARATUS

CROSS REFERENCE TO RELATED APPLICATIONS

The present application is a national phase entry under 35 U.S.C. § 371 of International Application No. PCT/GB2018/051373, filed on May 22, 2018, which claims the benefit of Great Britain Patent Application No. 1709067.1, filed on Jun. 7, 2017, the disclosures of which are hereby incorporated herein by reference.

The present invention relates to computer input devices and more particularly to a handheld controller employing one or more control sticks.

Even with the recent advances in performance capture (i.e., tracking of a system user's motion to induce a corresponding effect on a displayed graphic), a handheld controller with a control stick remains the most popular input device for the electronic game industry. FIG. 1 depicts a Sony DualShock 4® handheld controller 100 commercially available for a Sony Playstation® series of electronic gaming platforms. The handheld controller 100 includes dual thumb sticks 105 protruding from the controller body 101. Each thumb stick 105 provides a two-dimensional input (X,Y) which may be used to induce a corresponding effect on a displayed graphic. Each thumb stick 105, sometimes called an analog stick or more generally a control stick, provides positional input to a computing platform based on the position of the protrusion relative to a mechanical "center" position within the controller body 101. During use, a user's thumb (or other digit) typically rests on a top surface of each thumb stick 105 and pressure applied by the thumb may change the displacement of the thumb stick 105 relative to the center position, which may serve as a reference position. A pivoting base of each thumb stick 105 is coupled to two or more potentiometers housed within the controller body 101 to provide a continuous electrical output proportional to the displacement of the thumb stick 105 relative to the central reference position (hence, the term "analog stick").

While the control afforded by the continuous nature of the thumb stick 105 has made it a popular input means for handheld controllers (particularly for 3D games), the thumb stick 105 is nevertheless limited to the provision of a continuous electrical output proportional to the displacement of the thumb stick.

Means and techniques to enhance the input sensitivity and functionality of handheld computer input devices using one or more thumb sticks are therefore advantageous.

The present invention seeks to improve the responsiveness of handheld controllers comprising one or more thumb sticks.

In a first aspect, there is provided a controller for sensing a pressure applied to a control stick.

In another aspect, there is provided an entertainment device configured to receive data from a controller.

In another aspect, there is provided a method of determining a pressure applied to a control stick of a controller.

In another aspect, there is provided a method for receiving data from a controller and updating a game state of a game.

Further respective aspects and features of the invention are defined in the appended claims.

Embodiments of the present invention will now be described by way of example with reference to the accompanying drawings, in which.

Figure 1:
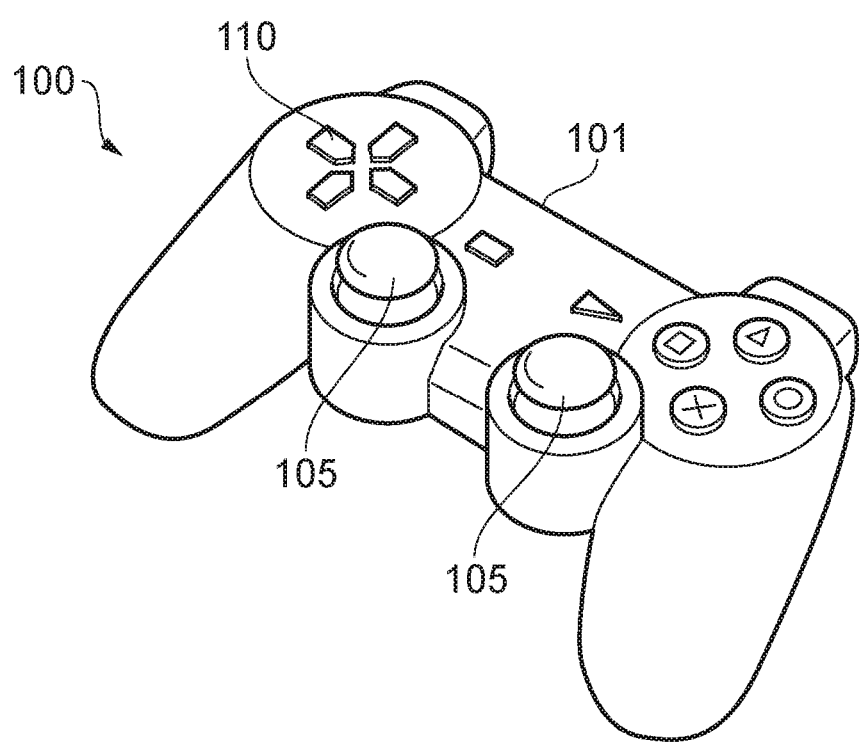
FIG. 1 illustrates an isometric view of a conventional handheld electronic game controller.

For clarity of illustration, elements illustrated in the figures have not necessarily been drawn to scale. Further, where considered appropriate, reference numerals have been repeated among the figures to indicate corresponding or analogous elements.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" is used to indicate that two or more elements are in direct physical or electrical contact with each other while "coupled" is used to indicate two or more elements are in either direct or indirect (with other intervening elements between them) physical or electrical contact with each other, and/or that the two or more elements co-operate or communicate with each other (e.g., as in a cause an effect relationship).

Methods and systems are disclosed for improving the responsivity of handheld computer input devices using one or more thumb sticks. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 2:
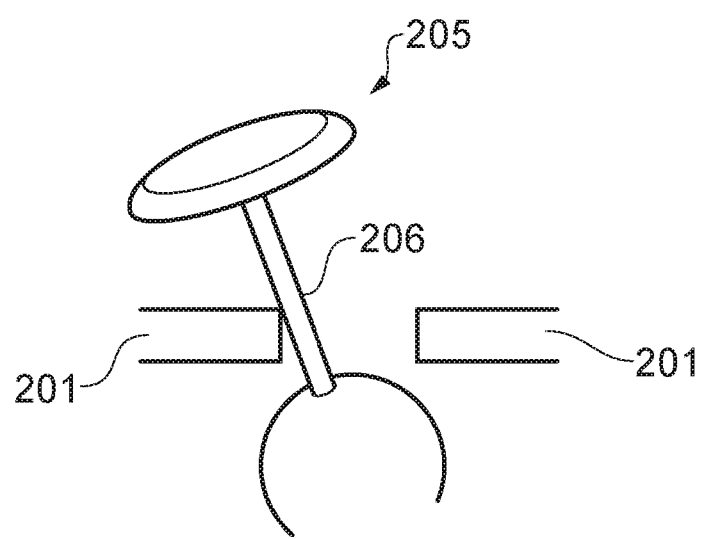
FIG. 2 illustrates an isometric view of a control stick at a displacement limit where a stem of the control stick contacts a controller body.

When using a handheld controller including a thumb stick, the force applied by the user's thumb may frequently displace the thumb stick 105, causing a surface of the thumb stick 105 to contact a surface of the controller body 101. FIG. 2 illustrates the thumb stick 205 when the user's thumb applies a force causing the thumb stick to reach a displacement limit where a stem 206 of the thumb stick contacts the controller body 201. At the displacement limit, the force applied by the user's thumb may vary significantly while the thumb stick displacement remains substantially the same. During game play, the user may become frustrated when the thumb stick reaches the displacement limit, as the full extent of the thumb stick's functionality has been reached and the thumb stick can provide no further game play input, which may cause the user to feel ineffectual.

During normal use, the gripping force applied to the top surface of the thumb stick 205 by the user's thumb may increase or decrease when changing the displacement of the thumb stick. In some examples, the user's thumb may apply a varying gripping force to the top surface of the thumb stick 205 whilst maintaining substantially the same displacement relative to the reference position. Consequently, the output signal due to the thumb stick displacement may remain substantially the same even though the user's thumb applies the varying gripping force.

In an embodiment of the present invention, a controller comprising at least a first control stick and one or more sensors configured to sense a pressure applied to at least one control stick, as described herein, may be implemented by a controller (such as the DualShock 4®) like that illustrated in FIG. 1, further comprising one or more pressure sensors such as a capacitance pressure sensor, resistance pressure sensor, piezoresistive pressure sensor, piezoelectric pressure sensor, optical pressure sensor, and/or an elastoresistive pressure sensor.

The controller comprises first circuitry configured to receive displacement information associated with a physical displacement of the control stick in a direction relative to a reference position when a pressure is applied to the control stick.

The controller comprises second circuitry configured to receive pressure information associated with the pressure applied to the control stick from one or more pressure sensors.

The controller comprises third circuitry configured to determine the displacement of the control stick and the applied pressure on the control stick, based on the displacement information received by the first circuitry and the pressure information received by the second circuitry.

In an embodiment of the present invention, the controller comprises a transmitter adapted to transmit data indicative of the determined displacement of the control stick and data indicative of the determined applied pressure on the control stick.

In an embodiment of the present invention, an entertainment device (such as the Sony® PlayStation 4® entertainment device) comprises a receiver adapted to receive data indicative of the determined displacement of the control stick and data indicative of the determined applied pressure on the control stick and a processor operable to update a game state of a game, in which the processor is operable to update the game state of the game responsive to the received data indicative of the determined displacement of the control stick, and the received data indicative of the determined applied pressure on the control stick.

For the purposes of explanation only and as a non-limiting example, the present description will refer to a DualShock 4® controller comprising one or more pressure sensors operating in conjunction with a Sony® PlayStation 4®.

Figure 3:
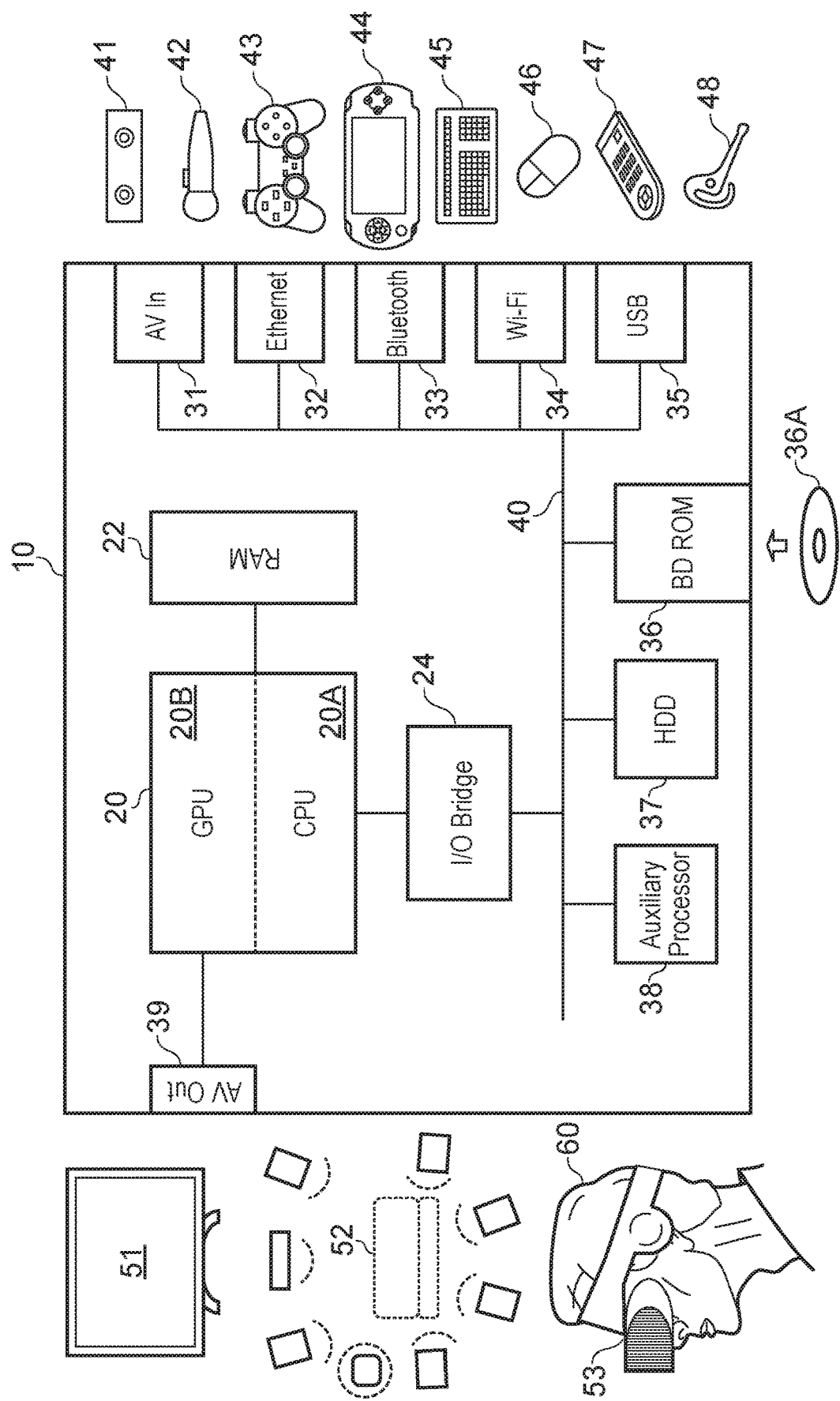
FIG. 3 is a schematic diagram of apparatus comprising an entertainment device and a controller comprising a transmitter, in accordance with an embodiment of the present invention.

Hence FIG. 3 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4® 100 illustrated in FIG. 1; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown). Data from the handheld videogame controller 43, 100 (such as the DualShock 4®) comprising one or more sensors configured to sense pressure can be received at the entertainment device for example via USB, Bluetooth® or Wifi® ports (33, 34, 35).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

The user may also interact with the system unit using a video camera 41 such as the PlayStation Eye®. This may provide monoscopic or stereoscopic video images to the system unit 10 via for example AV input 31. Where these images capture some or all of the user, the user may enact gestures, facial expressions or speech as appropriate to interact with the currently presented user interface.

Alternatively or in addition, a controller designed to assist with camera-based user interaction, such as the PlayStation Move® 42, may be provided. This controller has a wand form factor and an illuminated region that facilitates detection of the controller within a captured video image. Illuminated regions may similarly be provided on other controllers 43, such as on the DualShock 4®. Both kinds of controller may comprise motion sensors to detect transverse movement along three axes and rotational movement around three axes, and wireless communication means (such as Bluetooth®) to convey movement data to the system unit. Optionally such controls can also receive control data from the system unit to enact functions such as a rumble effect, or to change the colour or brightness of the illuminated region, where these are supported by the controller.

The system unit may also communicate with a portable entertainment device 44. The portable entertainment device 44 will comprise its own set of control inputs and audio/visual outputs. Consequently, in a 'remote play' mode some or all of the portable entertainment device's inputs may be relayed as inputs to the system unit 10, whilst video and/or audio outputs from the system unit 10 may be relayed to the portable entertainment device for use with its own audio/visual outputs. Communication may be wireless (e.g. via Bluetooth® or Wi-Fi®) or via a USB cable.

Other peripherals that may interact with the system unit 10, via either wired or wireless means, include a keyboard 45, a mouse 46, a media controller 47, and a headset 48. The headset may comprise one or two speakers, and optionally a microphone.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Referring now again to FIG. 3, in an embodiment of the present invention a controller 43 or 100 (such as the DualShock 4®) comprising at least a first control stick 105 and one or more sensors configured to sense a pressure applied to at least one control stick is provided.

The controller comprises first circuitry configured to receive displacement information associated with a physical displacement of the control stick 105 in a direction relative to a reference position when a pressure is applied to the control stick. The first circuitry may receive displacement information from one or more potentiometers housed within the controller body that provide a continuous electrical output proportional to the displacement of the control stick 105 relative to a reference position. The received displacement information may comprise information indicating an absolute X,Y position of the control stick or information indicating an X,Y position relative to a reference position $X_0, Y_0$.

The controller comprises second circuitry configured to receive pressure information associated with the pressure applied to the control stick from one or more of the sensors. The second circuitry may receive pressure information from the one or more sensors that are coupled to the control stick and/or positioned relative to the control stick. The operation of the one or more sensors is discussed later herein.

The controller comprises third circuitry configured to determine the displacement of the control stick and the applied pressure on the control stick, based on the displacement information received by the first circuitry and the pressure information received by the second circuitry.

The control stick can be displaced in at least two directions X,Y and has a range of physical X,Y displacement confined by a displacement limit. For example, the control stick may have a central reference position $X_0, Y_0$ from which the control stick can be displaced in at least a positive or negative X direction and/or a positive or negative Y direction. For a circular displacement limit with the reference position at the centre, the displacement limit in X is given by $\pm X_{max}$ and the displacement limit in Y is given by $\pm Y_{max}$, so that the displacement limit is defined by the following X,Y positions: $(-X_{max}, Y_0)$, $(+X_{max}, Y_0)$, $(X_0, -Y_{max})$ and $(X_0, +Y_{max})$. As such, for a circular displacement limit, the limit is defined by a circle that intersects these four X,Y positions, and any X,Y position within the confines of this circle is within the range of physical displacement. In such an example using a circular displacement limit, a physical displacement associated with an X,Y position resulting in $sqrt(X^2+Y^2)=|X_{max}|=|Y_{max}|$, represents a physical displacement of the control stick where the control stick reaches the displacement limit. It will be appreciated that similar principles can be applied to other symmetric displacement limits such as a square, a hexagonal or an octagonal displacement limit, for example.

At least a first sensor of the controller is configured to sense the pressure applied when the physical displacement of the control stick reaches a displacement limit. As described herein, the one or more sensors (e.g. typically a control stick) is sometimes subject to excess pressure by the user, i.e. more pressure than is required to move the control stick to its displacement limit in a given direction. The pressure applied in this condition may then be detected as a distinct input to the actual displacement itself. Some sensors may detect pressure while the control stick is being moved (for example if the sensor is on the part of the stick handled by the user), and in this case the pressure detected once the full displacement of the control stick has been detected can then be used as an input. Alternatively or in addition the sensor may only detect pressure once the control stick has reached the displacement limit (for example is the sensor is on a part of the control stick or controller housing that is only normally subjected to pressure by the contact of the control stick with the housing); in this case the pressure signal can also act as a de facto detection of the displacement limit, although a separate detection based on the displacement signal can also be implemented.

In an embodiment of the present invention, the controller 43, 100 comprises a transmitter adapted to transmit data indicative of the determined displacement of the control stick and data indicative of the determined applied pressure on the control stick. It will be apparent to those skilled in the art that data may be transmitted or communicated from the controller 43, 100 via wired or wireless communication means (such as Bluetooth® or Wi-Fi®).

The third circuitry of the controller is configured to determine the displacement of the control stick and the applied pressure on the control stick, and data indicative of the determined displacement and applied pressure is transmitted by the transmitter. The third circuitry may determine the displacement of the control stick by an analog-to-digital conversion of the displacement information provided to the second circuitry by the one or more potentiometers housed within the controller body. The continuous electrical output of the one or more potentiometers can be input to one or more ADC in order to determine one or more digital values indicative of the displacement of the control stick. For example, a first potentiometer may be associated with the X displacement and a second potentiometer may be associated with the Y displacement, such that the determined X,Y displacement may be indicated by one or more ADC values. The third circuitry can be configured to either determine an absolute displacement of the control stick within the displacement range based on an X,Y position indicated by the position information, or a relative displacement within the displacement range based on an X,Y position relative to the reference position $X_0, Y_0$. As such, the third circuitry is configured to translate the received displacement information into a representation that can be transmitted to the entertainment device as a meaningful input. In addition, the third circuitry is configured to determine the applied pressure on the control stick based on the pressure information received by the second circuitry, wherein the pressure information may take a variety of forms. Pressure information in the form of an analog signal or a digital representation may be received by the second circuitry and processed by the third circuitry to determine an applied pressure. The third circuitry can determine a relative change in the pressure sensed by the pressure sensor using an analog-to-digital conversion of an observed change in capacitance, current and/or resistance associated with the pressure sensor, for example (depending on the type of sensor used). Alternatively, the third circuitry may receive a digital representation and apply a meaningful calibration to determine the applied pressure. A pressure determination threshold, as described later herein, may be used by the third circuitry so that a binary representation distinguishes between pressure information exceeding the threshold and pressure information below the threshold. Optionally, the entertainment device 10 utilizes a pressure determination threshold and the applied pressure on the control stick can be determined based on pressure information transmitted to the entertainment device.

For an arrangement with a plurality of sensors, each sensor can be assigned a sensor ID and the third circuitry is operable to respectively determine the applied pressure sensed by each sensor. As such, the third circuitry can determine the pressure sensed by each pressure sensor so that data indicative of the pressure sensed by each sensor can be selectively transmitted to the entertainment device. Alternatively, data indicative of the pressure sensed by each of the plurality of sensors can be summed or subjected to a weighted averaging and transmitted to the entertainment device.

In an embodiment of the present invention, an entertainment device 10 (such as the Sony® PlayStation 4® entertainment device) comprises a receiver (such as an audio/visual input port 31, an Ethernet® port 32, a Bluetooth® wireless link 33, a Wi-Fi® wireless link 34, or one or more universal serial bus (USB) ports 35) adapted to receive data indicative of the determined displacement of the control stick 105 and data indicative of the determined applied pressure on the control stick 105, and a processor (such as the CPU 20A or APU 20 operating under suitable software instruction) operable to update a game state of a game, in which the processor is operable to update the game state of the game responsive to the received data indicative of the determined displacement of the control stick, and the received data indicative of the applied pressure on the control stick.

Hence in an embodiment of the present invention the processor (such as the CPU 20A or APU 20 operating under suitable software instruction) of the entertainment device 10 is operable to detect that the determined displacement of the control stick 105 is substantially equal to a predetermined displacement limit, and if so the processor is operable to interpret the data indicative of the determined applied pressure on the control stick as a distinct input, for example if it exceeds a predetermined threshold, and the processor is operable to update the game state of the game in response to that distinct input and corresponding image data is generated and output for a display device 51.

As noted previously, the processor may detect that the displacement of the control stick 105 is substantially equal to the predetermined displacement limit based on an X,Y position indicated by the received data indicative of the determined displacement of the control stick 105. Meanwhile, there may be a number of different predetermined thresholds, for which there is a first distinct input when the data indicative of the applied pressure on the control stick exceeds a first threshold, and a second distinct input when the data indicative of the applied pressure on the control stick exceeds a second threshold.

Hence for example, the magnitude of a given threshold may be different depending on the type of sensor used, the position of the sensor on the controller/control stick, or the user's characteristics. A calibration process may measure a range of typical pressure applied by a user during use and appropriately set a magnitude for the threshold. Alternatively, the magnitude of the threshold can be set in accordance with a user's preference or their profile (for example, setting lower thresholds for a child than an adult).

Figure 4:
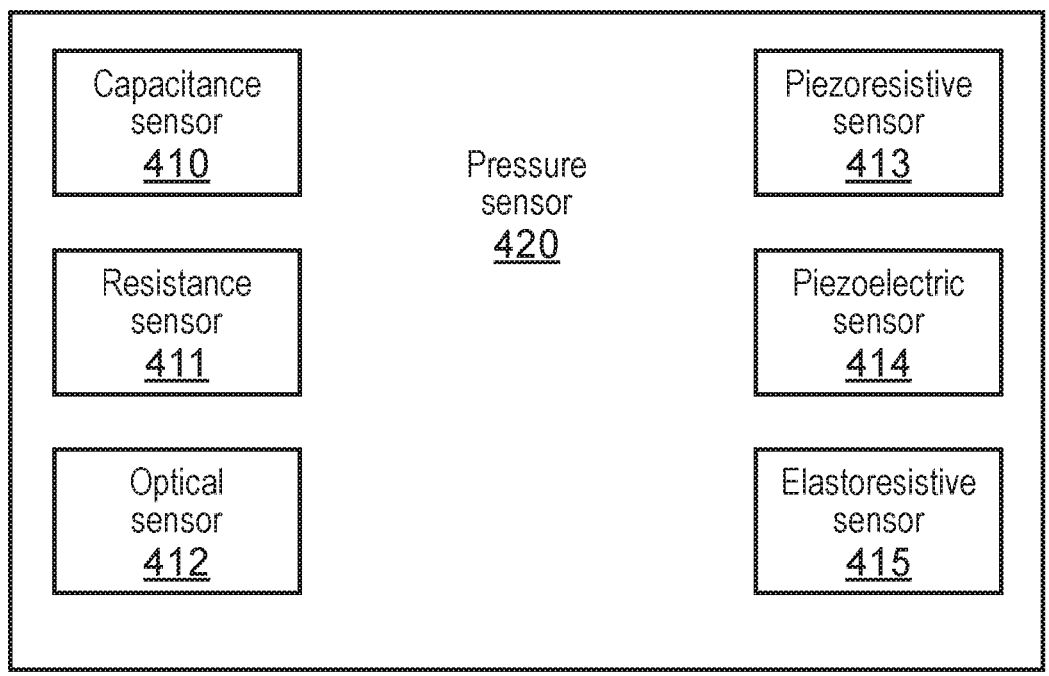
FIG. 4 is a functional block diagram of hardware to sense applied pressure to a control stick and generate corresponding pressure information.

FIG. 4 is a functional block diagram of hardware to sense pressure applied to the control stick 105 and generate corresponding pressure information, in accordance with embodiments of the present invention. With regards to the controller 43, 100, in embodiments of the present invention, the controller 43, 100 comprises one or more sensors 420 for sensing the pressure applied to the control stick and generating the corresponding pressure information. The one or more sensors for sensing the pressure applied to the control stick comprises one or more of the following: a capacitance pressure sensor 410; a resistance pressure sensor 411; a piezoresistive pressure sensor 413; a piezoelectric pressure sensor 414; an optical pressure sensor 412; and/or an elastoresistive pressure sensor 415. Other pressure sensors may similarly be considered. Generally, the sensor may be any tactile sensor known in the art that is capable of generating a signal and/or information corresponding to the pressure applied to the control stick when the control stick is being used for inputting displacement information (X,Y).

Pressure sensing implementations typically detect a deformation (distortion or otherwise) of some portion of the sensor. In an embodiment, a strain gauge registers an electrical resistance change when a localized portion of the sensor is deformed in response to an applied pressure (e.g., from a thumb, or contact with part of the controller body/ control stick) on the control stick. For example, a strain gauge 411 of the foil type may be disposed on a portion of the stem 206 of control stick 205, on a portion of the controller body 201 and/or below a deformable top surface of the control stick, and pressure information is generated when the foil is deformed by an applied pressure. For example, the strain gauge 411 may detect a deformation in the top surface resulting from a pressure on the top surface of the control stick due to the gripping force applied by the user's thumb (digit). Of course, semiconductor (piezoresistive) gauges and other suitable sensors may also be utilized in this same capacity as a foil gauge.

Figure 5A:
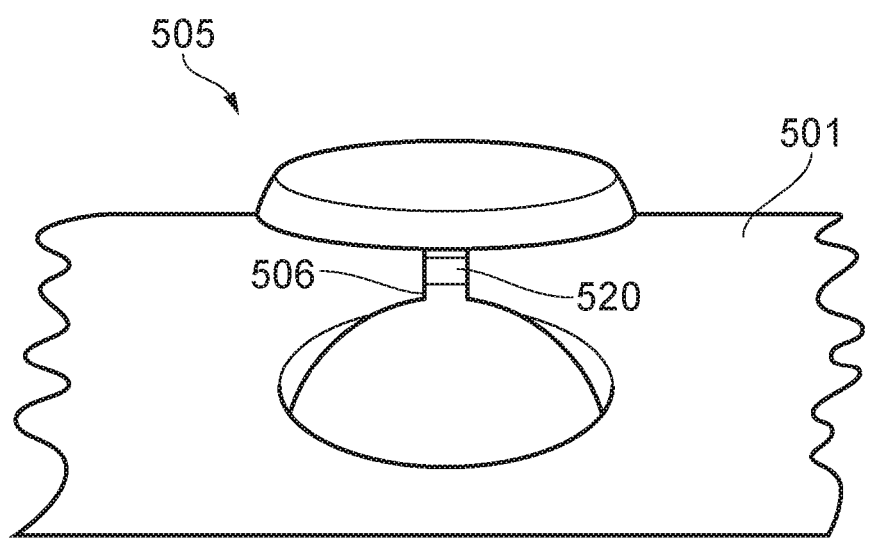
FIG. 5A illustrates an isometric view of a control stick of a controller with a pressure sensor coupled to a stem of the control stick, in accordance with an embodiment of the present invention.

In an embodiment of the present invention, one or more sensors for sensing pressure are coupled to at least a portion of a surface of a stem of the control stick to sense the pressure applied when the physical displacement of the control stick reaches a displacement limit. FIG. 5A illustrates an isometric view of a control stick 505 of a controller with a pressure sensor 520 coupled to a stem 506 of the control stick, in accordance with an embodiment of the present invention. When the control stick 505 is at the limit of its displacement, at least a portion of the pressure sensor 520 coupled to the stem 506 will contact a portion of the controller body 501, and the pressure sensor 520 will sense an applied pressure.

Hence if the physical displacement of the control stick 505 reaches the displacement limit, a portion of the surface of the controller body 501 contacts a portion of the pressure sensor 520 coupled to the surface of the stem 506, and the pressure sensor 520 is sensitive to the pressure applied to the control stick 505. At the displacement limit, a pressure is imparted on the pressure sensor 520 as the pressure sensor is in contact with the controller body 501, and pressure information is generated corresponding to the pressure applied to the control stick. The second circuitry of the controller 43, 100 is configured to receive such pressure information from the pressure sensor 520.

If the user's thumb applies a greater pressure to the control stick 505 while the control stick is at the displacement limit, the reading of the pressure sensor 520 will indicate the increase in applied pressure and generate corresponding pressure information. Similarly, if the user's thumb applies a smaller pressure to the control stick 505 while the control stick is at the displacement limit, the reading of the pressure sensor 520 will indicate the decrease in applied pressure and generate corresponding pressure information. When at the displacement limit, if the pressure applied by the user's thumb changes the displacement of the control stick to be less than the displacement limit (e.g., the control stick displacement moves from the displacement limit towards the reference position), then the pressure sensor 520 will sense a decreasing pressure applied to the control stick until the portion of the pressure sensor 520 no longer contacts the portion of the controller body, at which point the pressure sensor 520 no longer generates pressure information corresponding to the pressure applied to the control stick 520.

When the control stick 505 has a physical displacement that is less than the displacement limit, for example when the control stick is at the central reference position, the pressure sensor 520 is not sensitive to the pressure applied to the control stick by the user's thumb.

Alternatively or in addition, the displacement information associated with the physical displacement of the control stick, received by the first circuitry, can be used to determine in real-time whether the displacement of the control stick is less than or is equal to a predetermined displacement limit.

If the displacement information indicates that the displacement of the control stick is equal to the predetermined displacement limit, information from the pressure sensor 520 are processed, and pressure information received by the second circuitry corresponds to the pressure applied to the control stick 505. Meanwhile when the displacement information indicates that the displacement of the control stick is less than the predetermined displacement limit, information from the pressure sensor 520 is not processed.

Hence more generally displacement information provided to the first circuitry can be used to detect whether the displacement of the control stick is equal to the predetermined displacement limit, and if so a portion of the pressure sensor 520 is in contact with a portion of the controller body 501 and the second circuitry receives pressure information corresponding to the pressure applied to the control stick 505.

Optionally, the second circuitry may be configured to receive or process pressure information associated with the pressure applied on the control stick 505 from one or more pressure sensors 520 only when the displacement information received by the first circuitry indicates that the physical displacement of the control stick corresponds to the displacement limit.

The one or more sensors coupled to at least a portion of the stem of the control stick may be one of or any suitable combination of the pressure sensors (410, 411, 412, 413, 414, 415) illustrated in FIG. 4. In the control stick 505 illustrated in FIG. 5A, the first circuitry is configured to receive the displacement information associated with the displacement of the control stick 505 in a direction relative to a reference position, and the second circuitry is configured to receive from the sensor 520 pressure information associated with the pressure applied to the control stick 505 when the control stick is at the displacement limit. The third circuitry is configured to determine the displacement of the control stick 505 and the applied pressure on the control stick 505 based on the information received by the first and second circuitry.

The transmitter of the controller comprising the control stick 505 is adapted to transmit data indicative of the determined displacement and determined applied pressure on the control stick 505. The receiver of the entertainment device 10 is adapted to receive data indicative of the determined displacement and determined applied pressure on the control stick 505, and the processor 20A or 20 is operable to update the game state of the game responsive to the data. Based on the data indicative of the determined displacement, the processor 20A or 20 is operable to detect that the displacement of the control stick 505 is substantially equal to the predetermined displacement limit. If the detected displacement is substantially equal to the predetermined displacement limit, the processor is operable to interpret the data indicative of the applied pressure on the control stick 505 exceeding a predetermined pressure threshold as a distinct input. Depending on the position of the sensor, this threshold may be zero (for example in the case of a sensor collar positioned on the stem of the control stick coming into contact with the rim of the controller body) or may be equal to the pressure required by the user to maintain the control stick at the maximum displacement position (or a predetermined amount greater than this), in the case of a sensor mounted on the top surface of the control stick. As noted previously, further additional predetermined threshold levels may also be detectable in this manner.

The processor is operable to update the game state of the game responsive to the distinct input. As such, the game state of the game can be updated in accordance with both the displacement of the control stick 505 and the pressure information generated by the pressure sensor 520 when the physical displacement of the control stick reaches the displacement limit. When the applied pressure on the control stick is determined to exceed the predetermined threshold, the distinct input may be interpreted as a new input that did not already exist, such as an audio input to enhance the user's experience. Alternatively or in addition, the distinct input can provide a user with a new input control that is not already provided by the other buttons on the controller (e.g., jumping in a game), or the distinct input can provide an input control function that supplements an already existing control function, such as increased running speed or additional steering control for a driving game.

More generally, the distinct input may take a binary form when exceeding a threshold, being interpreted as the press of a virtual button or mouse click to indicate selection of a predetermined behaviour or function, or the input may take a continuous form, being interpreted for example as a continuation of a directional command provided by the control stick (e.g. turn left, but more so), or as a distinct variation of that command e.g. (turn left more, but this will now incur tyre damage/engine overheat etc., and can only be done for a limited time) and so convey the non-standard usage of the input.

The data indicative of the determined displacement of the control stick 505 may be considered in conjunction with the data indicative of the determined applied pressure on the control stick 505, so that an applied pressure exceeding the threshold with a first displacement value (at the displacement limit) provides a different distinct input to an applied pressure exceeding the threshold with a second displacement (at the displacement limit). For example, this means that when the user pushes the control stick in the forwards direction (away from the user) and the displacement limit is reached, a different input may be provided compared to when the user pulls the control stick in the backwards direction (towards the user) and the displacement limit is reached. These different inputs may be contextual to the game, so that for example excess pressure in the forward direction launches an attack against an opponent, whilst excess pressure in the backward direction raises a shield. Optionally, a different threshold may be associated with the first displacement than the second displacement.

Hence more generally, when the physical displacement of the control stick reaches the displacement limit, data indicating the displacement and applied pressure are considered in conjunction and a first distinct input is associated with a first displacement and a second distinct input is associated with a second displacement. A distinct input may be an input that supplements an existing input (allows faster running, additional steering capability) or a new input (new functionality of controller) that is not provided by any other button on the controller, such as an audio input (e.g. toggling a microphone on or off for voice chat, which may be an infrequently used option or one not used at all, and hence may not justify dedicated assignment to one of the limited number of physical buttons on the controller).

Figure 5B:
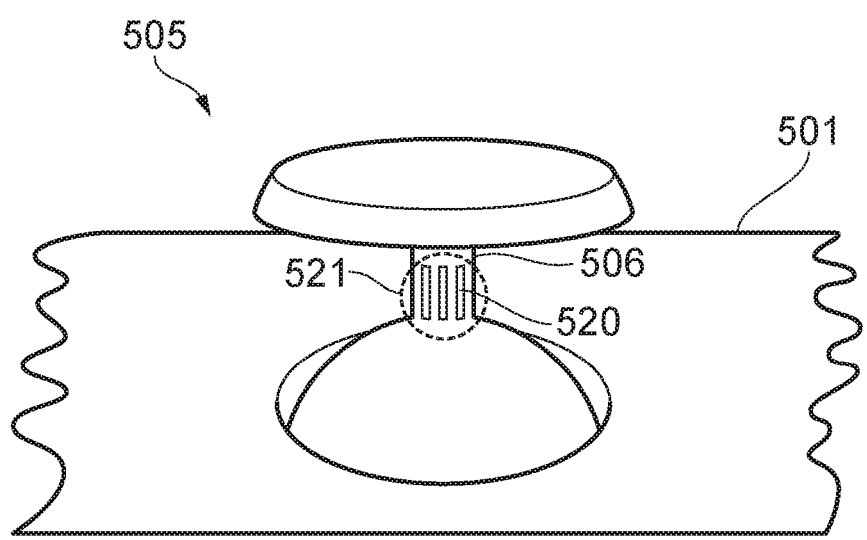
FIG. 5B illustrates an isometric view of a control stick of a controller with a plurality of pressure sensors coupled to a stem of the control stick, in accordance with an embodiment of the present invention.

In an embodiment of the present invention, a plurality of capacitance pressure sensors 410 or resistance pressure sensors 411 may be coupled to the stem 506 or a combination of capacitance pressure sensors 410 and resistance pressure sensors 411 may be coupled to the stem. It will be understood by those skilled in the art that many other possible arrangements of pressure sensors 420 coupled to the stem 506 of the control stick 505 may be practiced. FIG. 5B illustrates an isometric view of a control stick 505 of a controller 43, 100 with a plurality of pressure sensors 520 coupled to a stem 506 of the control stick, in accordance with an embodiment of the present invention. The plurality of pressure sensors 521 coupled to the stem may comprise a single type of pressure sensor or any suitable combination of types of pressure sensor.

The relative positioning of the plurality of sensors 521 on the surface of the stem 506 and pressure information generated by each sensor 520, when the control stick is at the displacement limit, can be used to map the generated pressure information to determine an approximate orientation of the control stick 505. For example, if four sensors are coupled to respective portions of the stem 506 and only one of the sensors generates pressure information associated with the pressure applied to the control stick by the user's thumb, then the approximate orientation of the control stick can be determined. In this case, at least a portion of the pressure sensor that is generating the pressure information must be in contact with at least a portion of the controller body 501 and the approximate orientation of the control stick can be determined based on the position on the stem 506 of the pressure sensor generating the pressure information.

In some examples, the processor 20A or 20 of the entertainment device 10 is operable to interpret the data, from the controller 43, 100, indicative of the applied pressure on the control stick 505 in such a manner that the pressure information generated by each of the plurality of sensors 521 can be respectively interpreted by the processor 20A or 20 as a distinct input. In other words, each of the plurality of sensors coupled to the stem may be associated with its own distinct input. Alternatively, the pressure information generated by each of the plurality of sensors 521 can be combined (fused) together and interpreted by the processor 20A or 20 as a single distinct input.

For example, in an arrangement where four sensors are coupled to the surface of the stem 506 and equally distributed around the circumference of the stem, for a game in which a user drives a car, one of the sensors is positioned to be associated with a left turn control input, while another sensor (on the opposite side of the surface of the control stick) is positioned to be associated with a right turn control input. When the pressure information generated by the pressure sensor associated with the left turn control input exceeds a predetermined threshold, the processor may interpret data associated with the pressure information as an input and update the game state with an audio sound, such as screeching tyres and/or with an additional steering control input associated with a left turn to aid the user. In a similar manner, the processor may interpret data associated with the pressure information generated by the pressure sensor associated with the right turn control input as an input and update a game state with an audio sound and/or an additional steering control input associated with a right turn to aid the user by supplementing the right turn control input.

Hence more generally, for a plurality of pressure sensors coupled to a stem 506 of a control stick 505, data indicative of pressure information generated by each of the plurality of sensors 521 can be respectively interpreted by the processor 20A or 20 as a distinct input. As such, each sensor may have its own (unique) distinct input.

Figure 6A:
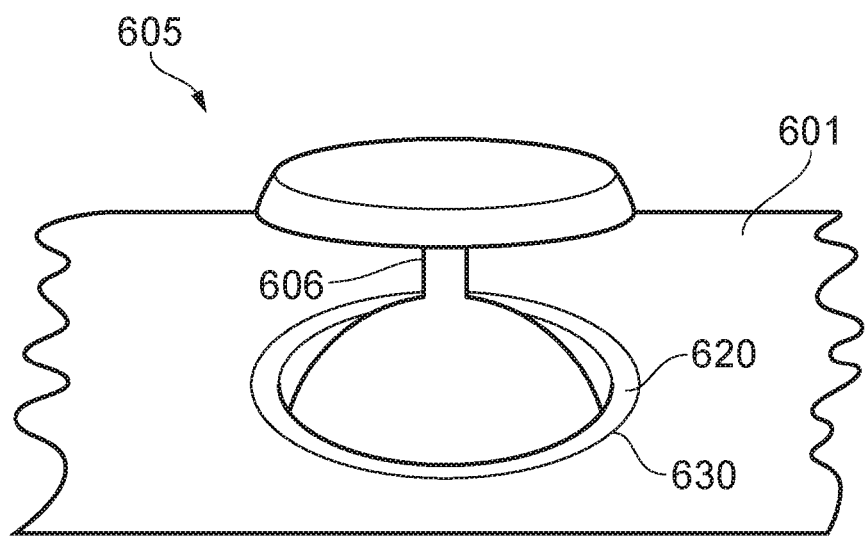
FIG. 6A illustrates an isometric view of a control stick of a controller with a pressure sensor positioned to contact a stem of the control stick when the physical displacement of the control stick reaches a displacement limit, in accordance with an embodiment of the present invention.

The preceding embodiments discuss placing pressure sensors on the control stick. However, alternatively or in addition in an embodiment of the present invention, one or more sensors may be positioned on the controller rim surrounding the control stick to contact a stem of the control stick when the physical displacement of the control stick reaches a displacement limit. FIG. 6A illustrates an isometric view of a control stick 605 of a controller 100 with a pressure sensor 620 positioned to contact a stem 606 of the control stick 605 when the physical displacement of the control stick reaches the displacement limit, in accordance with an embodiment of the present invention.

The one or more pressure sensors 620 are positioned on at least a portion of a rim 630 of the controller body 101, 601 disposed at the displacement limit of the control stick 605. When the control stick 605 is at the limit of its displacement, at least a portion of the pressure sensor 620 will contact at least a portion of the stem 605 of the control stick 605, and the pressure sensor 620 will sense an applied pressure. If the physical displacement of the control stick 605 reaches the displacement limit, the pressure sensor 620 is sensitive to the pressure applied to the control stick 605. At the displacement limit, the surface of the stem 606 of the control stick 605 imparts a pressure on the pressure sensor 620 and pressure information corresponding to the pressure applied to the control stick is generated. The second circuitry of the controller is configured to receive such pressure information from the pressure sensor 620.

If the user's thumb applies a greater pressure to the control stick 605 while the control stick is at the displacement limit, the reading of the pressure sensor 620 will indicate the increase in applied pressure and generate corresponding pressure information. Similarly, if the user's thumb applies a smaller pressure to the control stick 605 while the control stick is at the displacement limit, the reading of the pressure sensor 620 will indicate the decrease in applied pressure and generate corresponding pressure information. When at the displacement limit, if the user's thumb causes the displacement of the control stick to be less than the displacement limit (e.g., the control stick displacement moves from the displacement limit towards the reference position), the pressure sensor 620 will sense a decreasing pressure until the portion of the pressure sensor 620 no longer contacts the portion of the stem 606 of the control stick 605.

When the control stick 605 has a physical displacement that is less than the displacement limit, for example when the control stick is at the central reference position, the pressure sensor 620 is not sensitive to the pressure applied to the control stick by the user's thumb.

As noted previously, alternatively or in addition, the displacement information associated with the physical displacement of the control stick, received by the first circuitry, can be used to determine in real-time whether the displacement of the control stick is less than or is equal to a predetermined displacement limit. If the displacement information indicates that the displacement of the control stick 605 is equal to the predetermined displacement limit, the pressure sensor 620 is sensitive to the pressure applied to the control stick 605 and pressure information corresponding to the pressure applied to the control stick 605 is received by the second circuitry. However, when the displacement information indicates that the displacement of the control stick is less than the predetermined displacement limit, the pressure sensor 620 is not sensitive to the pressure applied to the control stick 605.

Hence more generally, displacement information provided to the first circuitry can be used to detect whether the displacement of the control stick 605 is equal to the predetermined displacement limit, and if so a portion of the pressure sensor 620 is in contact with a portion of the stem 606 of the control stick 605 and the second circuitry will receive pressure information corresponding to the pressure applied to the control stick 605.

Again as noted previously herein, the second circuitry of the controller may optionally be configured to receive pressure information from the one or more pressure sensors 620 only when the displacement information received by the first circuitry indicates that the control stick is at the displacement limit.

Figure 6B:
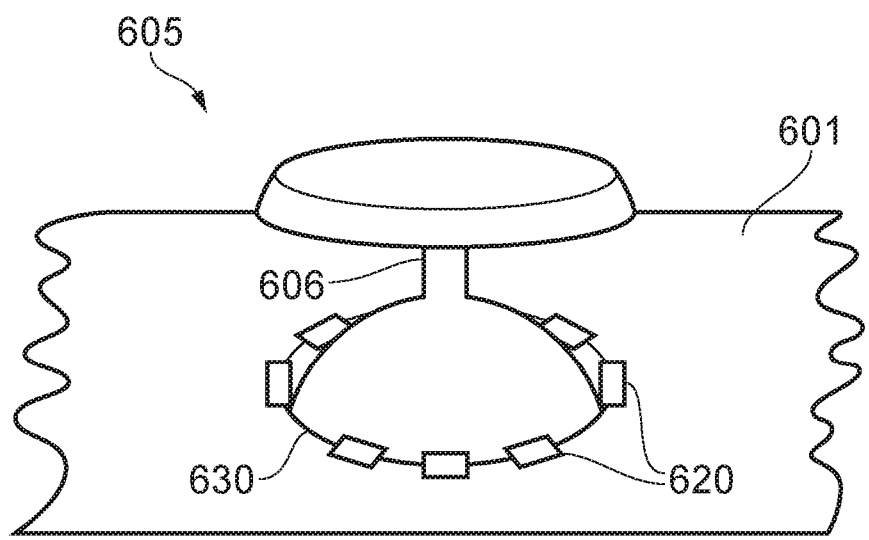
FIG. 6B illustrates an isometric view of a control stick of a controller with a plurality of pressure sensors positioned to contact a stem of the control stick when the physical displacement of the control stick reaches a displacement limit, in accordance with an embodiment of the present invention.

FIG. 6B illustrates an isometric view of a control stick 605 of a controller 100 comprising a plurality of pressure sensors 620 positioned to contact a stem 606 of the control stick 605 when the physical displacement of the control stick reaches a displacement limit. The plurality of pressure sensors 620 are positioned on at least a portion of the rim 630 disposed at the displacement limit of the control stick 605. As noted previously, similar principles can be applied to other symmetric displacement limits such as a square, a hexagonal or an octagonal displacement limit.

It will be apparent to those skilled in the art that the one or more sensors positioned to contact the stem of the control stick at the displacement limit may be one of or any combination of the pressure sensors (410, 411, 412, 413, 414, 415) illustrated in FIG. 4, and that many possible arrangements of pressure sensors positioned on a portion of the rim 630 may be practiced. In some examples, the approximate orientation of the control stick 605 can be determined based on the position on the rim 630 of the pressure sensors and the pressure information generated by each of the plurality of sensors. Furthermore, a distinct input may be associated with each of the plurality of sensors positioned on at least a portion of the rim 630.

Figure 7A:
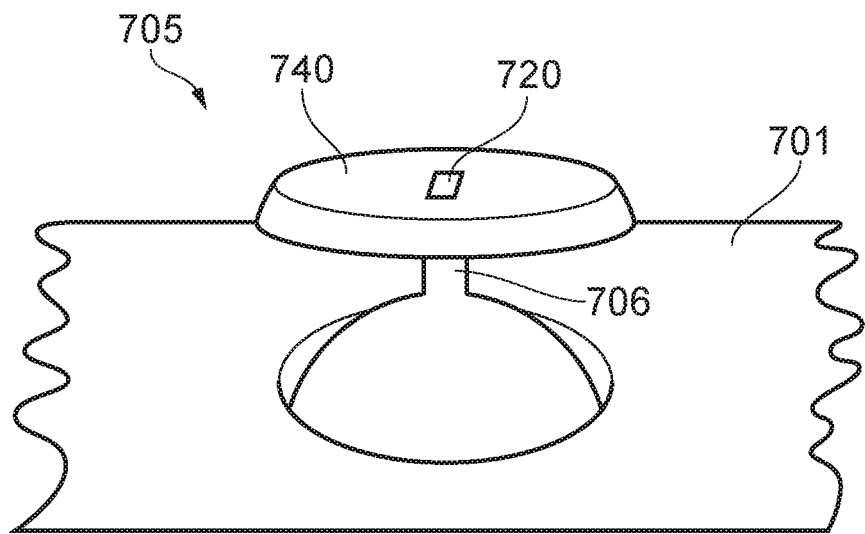
FIG. 7A illustrates an isometric view of a control stick with a pressure sensor disposed on a top surface of the control stick, in accordance with an embodiment of the present invention.

In an embodiment of the present invention, one or more sensors are disposed on a top surface of the control stick. FIG. 7A illustrates an isometric view of a control stick 705 with a pressure sensor 720 disposed on a top surface 740 of the control stick 705, in accordance with an embodiment of the present invention. As described previously, a user's thumb will typically rest on the top surface of the control stick and apply a pressure to the top surface that displaces the control stick. One or more pressure sensors 720 disposed on the top surface 720 sense the pressure applied to the top surface of the control stick when the user's thumb contacts the top surface.

A varying pressure may be applied to the top surface 740 of the control stick 705 by the user's thumb, which causes the physical displacement of the control stick. Changes in the direction of the pressure applied to the top surface by the thumb will displace the control stick in one direction to another. When the control stick 705 is not at the displacement limit and free to move in any X,Y direction, the pressure sensor 720 disposed on the top surface 740 can sense the pressure applied to the control stick 705 by the user's thumb. In addition, the pressure sensor 720 disposed on the top surface can sense the pressure applied to the control stick when the control stick is at the displacement limit.

For example, the user's thumb may apply a downward (Z direction) gripping pressure to the top surface 740 of the control stick 705 so that the displacement of the control stick does not change substantially from the reference position, and the X,Y displacement does not reach the displacement limit. In this manner, the stem 706 of the control stick 705 does not contact the controller body 701, but the pressure sensor 720 disposed on the top surface 740 senses the pressure applied by the user's thumb and generates corresponding pressure information which is received by the second circuitry.

As illustrated in FIG. 7A, the pressure sensor 720 is disposed in the centre of the top surface 740 to sense the pressure applied to the control stick 705 by the user's thumb/digit. The pressure information generated by the sensor 720 is received by the second circuitry and data indicative of the applied pressure is transmitted to the entertainment device 10. The entertainment device 10 interprets data indicative of the applied pressure exceeding the predetermined threshold as a distinct input, and the game state of the game can be updated by the processor 20 or 20A responsive to the received data. As such, the processor can update the game state of the game based upon the pressure applied to the top surface 740 of the control stick by the user's thumb when the control stick is free to move in any X,Y direction and when the control stick is at the displacement limit.

One or more sensors 720 can be disposed at different positions on the top surface of the control stick. For more than one sensor, each pressure sensor generates pressure information corresponding to the pressure applied to the control stick by the user's thumb. Accordingly, pressure information generated by each of the pressure sensors is received by the second circuitry and the applied pressure on the control stick 705 can be determined as well as the position and/or orientation of the user's thumb on the top surface.

Hence more generally one or more sensors positioned across the top surface of the control stick provide pressure information to the second circuitry for respective positions on the top surface for determining the applied pressure on the control stick and the position and/or orientation a user's digit applying the pressure.

Acquiring pressure information for one or more respective positions on the top surface 740 of the control stick 705 means that the displacement information and pressure information can be received by the first and second circuitry when the control stick is at the displacement limit and when the control stick is not at the displacement limit (free to move in any X,Y direction). The displacement of the control stick and the applied pressure on the control stick can be determined as well as the position and/or orientation of the user's thumb (digit).

Figure 7B:
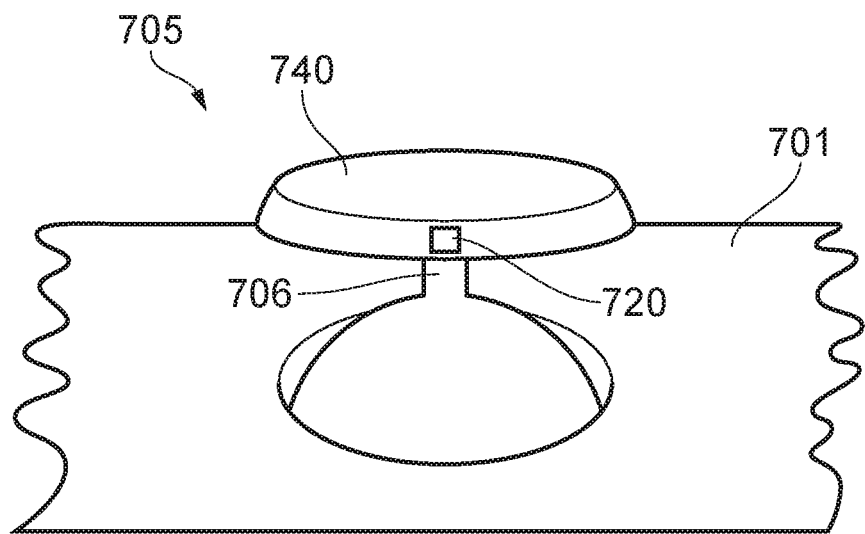
FIG. 7B illustrates an isometric view of a control stick with a pressure sensor disposed on a perimeter of a top surface of the control stick, in accordance with an embodiment of the present invention.

FIG. 7B illustrates an isometric view of the control stick 705 with the pressure sensor 720 disposed on the perimeter of the top surface 740, in accordance with an embodiment of the present invention. The pressure sensor 720 senses the pressure applied to the top surface of the control stick and can sense when the user's thumb is applying a pressure to the edge of the top surface 740, which may occur during use when the user's thumb slides across the top surface. Sensing, by the sensor 720 on the perimeter of the top surface 740, that the user's thumb is applying pressure to the edge of the control stick 705 exceeding a predetermined threshold can be interpreted as a distinct input. As noted previously, the game state of the game can be updated in response to such a distinct input.

Figure 7C:
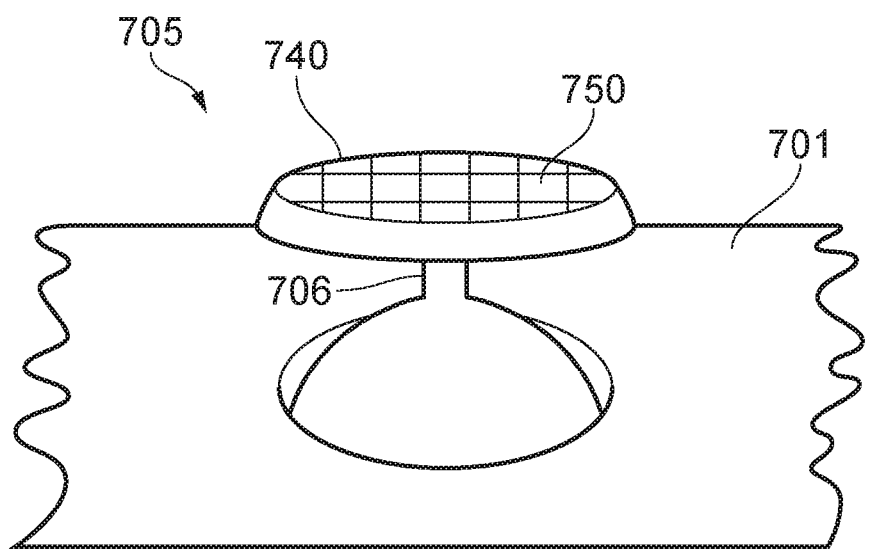
FIG. 7C illustrates an isometric view of a control stick with an embedded two-dimensional pressure sensor array positioned across a top surface of the control stick, in accordance with an embodiment of the present invention.

In an embodiment of the present invention, the one or more sensors disposed on the top surface 740 of the control stick is an embedded two-dimensional sensor array 750 that detects the pressure applied to the top surface 740 of the control stick 705 and/or the orientation of the user's thumb. FIG. 7C illustrates an isometric view of a control stick 705 with an embedded two-dimensional pressure sensor array 750 positioned across a top surface 740 of the control stick 705, in accordance with an embodiment of the present invention. The embedded two-dimensional sensor array 750 is capable of generating pressure information that is mapped across the top surface of the control stick to determine the pressure applied to the top surface and the position and/or orientation of the user's thumb.

The embedded two-dimensional sensor array 750 senses the pressure applied to the top surface of the control stick and generates pressure information, which is received by the second circuitry. The third circuitry is configured to determine the displacement of the control stick based on the displacement information (received by first circuitry), as well as the applied pressure on the control stick, and the position and/or orientation of the user's thumb on the top surface based on the received pressure information. As such, the applied pressure on the control stick can be determined from the pressure information generated by the sensor array when the control stick is at the displacement limit or when the control stick is free to move in any X,Y direction.

Data indicative of the determined displacement and the determined applied pressure on the control stick is transmitted by the transmitter of the controller to the entertainment device 10. Whether or not the processor detects that the displacement of the control stick is substantially equal to the predetermined displacement limit, the data indicative of the determined applied pressure on the control stick can be interpreted as a distinct input when the data indicates that the applied pressure exceeds a predetermined threshold. Consequently, the processor 20 or 20A can update the game state of the game (or other executing application) in response to the distinct input associated with the pressure applied to the top surface of the control stick by the users thumb whether or not the control stick is at the displacement limit.

Hence more generally an embedded sensor array on the top surface of the control stick generates pressure information associated with the pressure applied to the control stick and position and/or orientation information for the user's digit by mapping the generated pressure information from the embedded sensor array to a coordinate space. Data indicative of the applied pressure on the control stick, corresponding to the pressure information generated by the embedded sensor array on the top surface, can be interpreted by the processor of the entertainment device as a distinct input.

It will be appreciated that such a plurality of signals represents a distribution of the user's digit pressure on the top of the controller, and this distribution may also be analysed for the purposes of interpretation as an input. For example, if the pressure distribution indicates more pressure in a direction consistent with moving the control stick further in the current displacement direction, then this indicates that further displacement is imminent. This may be used to initialise in-game events relevant to an outcome caused by such further displacement, such as loading audio associated with a crash. Meanwhile evenly distributed pressure indicates an intention to maintain the current displacement. This may be used for example to initialise game features associated with a steady state in-game, such as displaying messages, or activating a reticule or the like. Finally, a pressure distribution indicating more pressure in a direction consistent with changing or reversing the direction of control stick displacement may be detected before such a change of displacement actually occurs, and depending upon the amount of pressure, may be indicative of the extent of the change like to occur in the near future. In this case, this may be used to initialise game features associated with avoiding an imminent threat, or game assets associated with choosing a different game path or the like, momentarily earlier than if the system had to wait for the displacement to actually occur. This can improve in-game responsiveness and stability.

Figure 7D:
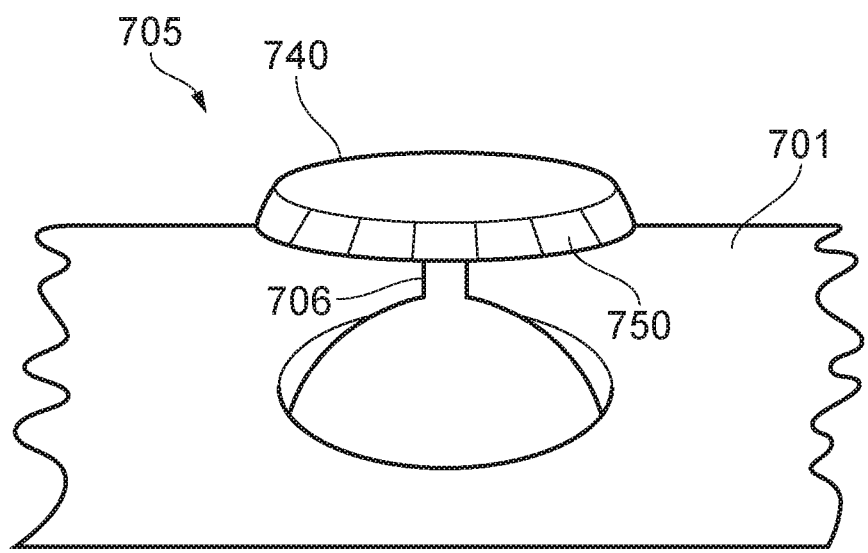
FIG. 7D illustrates an isometric view of a control stick with an embedded two-dimensional pressure sensor array positioned around a perimeter of the top surface, in accordance with an embodiment of the present invention.

In an embodiment of the present invention, one or more sensors are disposed around a perimeter of the top surface. FIG. 7D illustrates an isometric view of a control stick with an embedded two-dimensional pressure sensor array 750 positioned around a perimeter of the top surface 740, in accordance with an embodiment of the present invention. The embedded two-dimensional sensor array 750 is capable of generating pressure information that is mapped around the perimeter of top surface of the control stick to determine the pressure applied to the top surface perimeter and detect when the user's thumb slides across the top surface and rolls onto the edge of the top surface.

During use a user's thumb may push hard on the control stick causing the user's thumb to roll onto the edge of the top surface. The pressure sensor array 750 positioned around a perimeter of the top surface 740 detects the presence of the user's thumb on the perimeter, which can be interpreted as a distinct input when the pressure exceeds a threshold. The distinct input associated with the presence of the user's thumb on the perimeter of the top surface could be interpreted as a 'snap turn' within a game, so that a game state of a game is updated with a 'snap turn' for a user's character when the user rolls their thumb onto the perimeter of the top surface of the control stick with a pressure exceeding a predetermined threshold, for example.

Figure 7E:
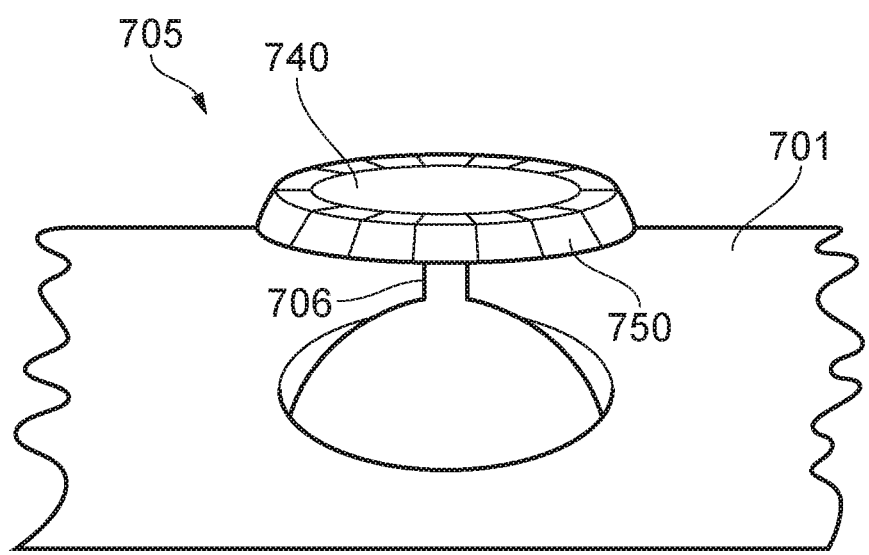
FIG. 7E illustrates an isometric view of a control stick with an with an embedded two-dimensional pressure sensor array positioned around a perimeter of the top surface and extending across a portion of the top surface, in accordance with an embodiment of the present invention.

FIG. 7E illustrates an isometric view of a control stick 705 with an with an embedded two-dimensional pressure sensor array 750 positioned around a perimeter of the top surface and extending across a portion of the top surface 740, in accordance with an embodiment of the present invention. The embedded two-dimensional pressure sensor array positioned around the perimeter of the top surface 740 can extend in a direction from the perimeter towards the centre of the top surface 740, and at least a portion of the pressure sensor array 750 is disposed across the top surface 740 of the control stick 705 to form an annular ring of a predetermined width. As such, the embedded two-dimensional pressure sensor array 750 may be positioned both around the perimeter of the top surface and across at least a portion of a circumference on the top surface 740. The embedded two-dimensional sensor array 750 can generate pressure information that is mapped around the perimeter of top surface and across at least a portion on the top surface 740 of the control stick, and may be associated with a distinct input. Having the two-dimensional pressure sensor array 750 disposed around both the perimeter of the top surface and across the top surface may provide a greater level of control during use when a user's thumb may typically rest on the top surface and slide across the top surface onto or towards the edge of the top surface.

Alternatively, a first embedded two-dimensional pressure sensor array 750 may be positioned around the perimeter, and a second embedded two-dimensional pressure sensor array 750 may be disposed across a portion of the circumference of the top surface 740 extending in a direction towards the centre of the top surface to form an annular ring of a predetermined width. The pressure information from the first embedded sensor and the second embedded sensor may be interpreted together as a distinct input or interpreted respectively as two respective distinct inputs.

It will be apparent to those skilled in the art that various combinations of the embodiments of the present invention as described and claimed herein are considered within the scope of the present invention. For example, it will be appreciated that the following arrangement is considered within the scope of the present invention: a controller comprising: a control stick; a first sensor positioned on at least a portion of a rim disposed at a displacement limit of the control stick; a second sensor disposed on a top surface of the control stick; first circuitry configured to receive displacement information associated with a physical displacement of the control stick in a direction relative to a reference position when a pressure is applied to the control stick; second circuitry configured to receive from the sensors pressure information associated with the pressure applied to the control stick; and third circuitry configured to determine the displacement of the control stick and the applied pressure on the control stick, based on the received displacement information and the pressure information.

In an arrangement having a plurality of sensors positioned on any of the rim, the stem and the top surface, each of the sensors may be associated with a different distinct input or the same distinct input when the applied pressure exceeds a threshold. For example, the pressure sensor disposed on the top surface could either be associated with a different distinct input to the pressure sensor positioned on at least a portion of the rim, or the two sensors could have the same distinct input when the applied pressure exceeds a threshold. Similarly, a sensor positioned on a portion of the rim may have a different pressure threshold than a sensor disposed on the top surface.

Figure 8:
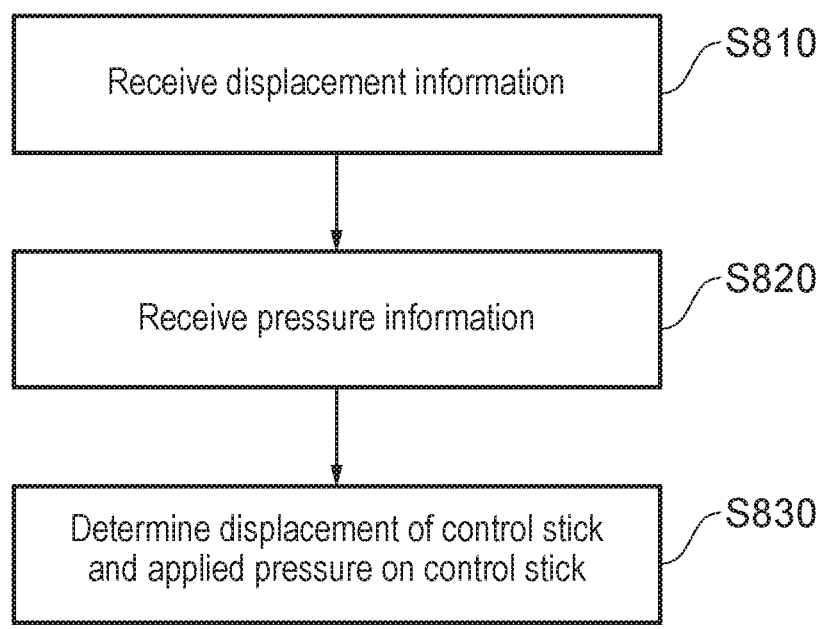
FIG. 8 is a flow diagram illustrating a method of determining a displacement of a control stick and a pressure applied on the control stick, in accordance with an embodiment of the present invention.

In an embodiment of the present invention, a method for determining a displacement of a control stick and an applied pressure on the control stick is provided. FIG. 8 is a flow diagram illustrating a method, in accordance with an embodiment of the present invention, in which displacement information associated with a physical displacement of a control stick in a direction relative to a reference position when a pressure is applied to the control stick is received at a step S810. At a step S820, pressure information is received that is associated with the pressure applied to the control stick. Based on the received displacement information and the received pressure information, the displacement of the control stick and the applied pressure on the control stick is determined at a step S830.

Figure 9:
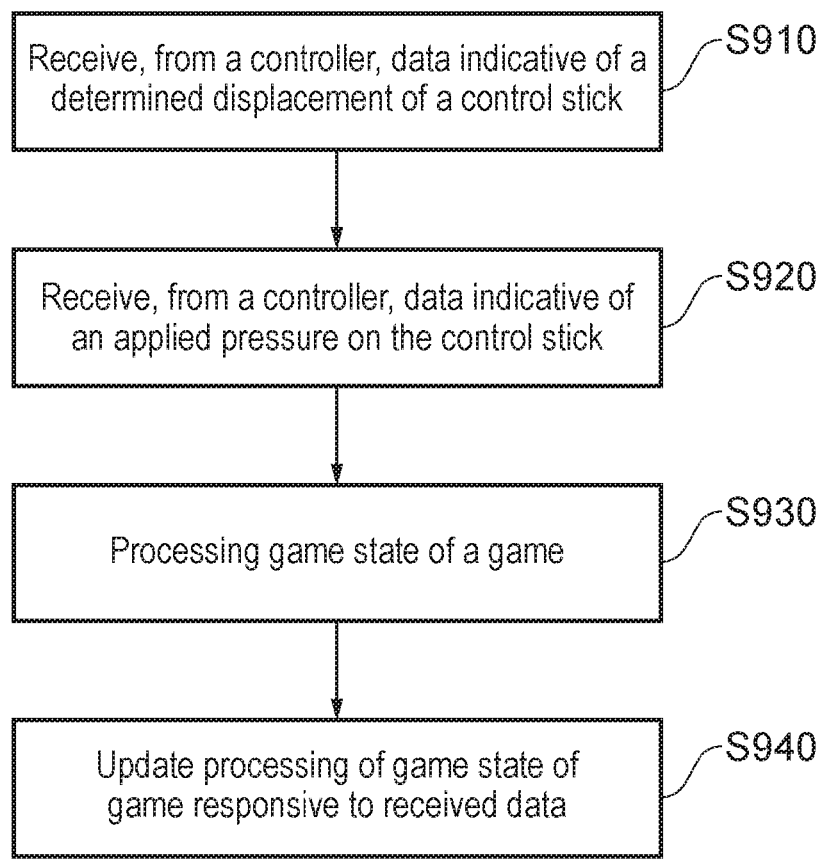
FIG. 9 is a flow diagram of a method of receiving data from a controller and updating a game state of a game, in accordance with an embodiment of the present invention.
Figure 10:
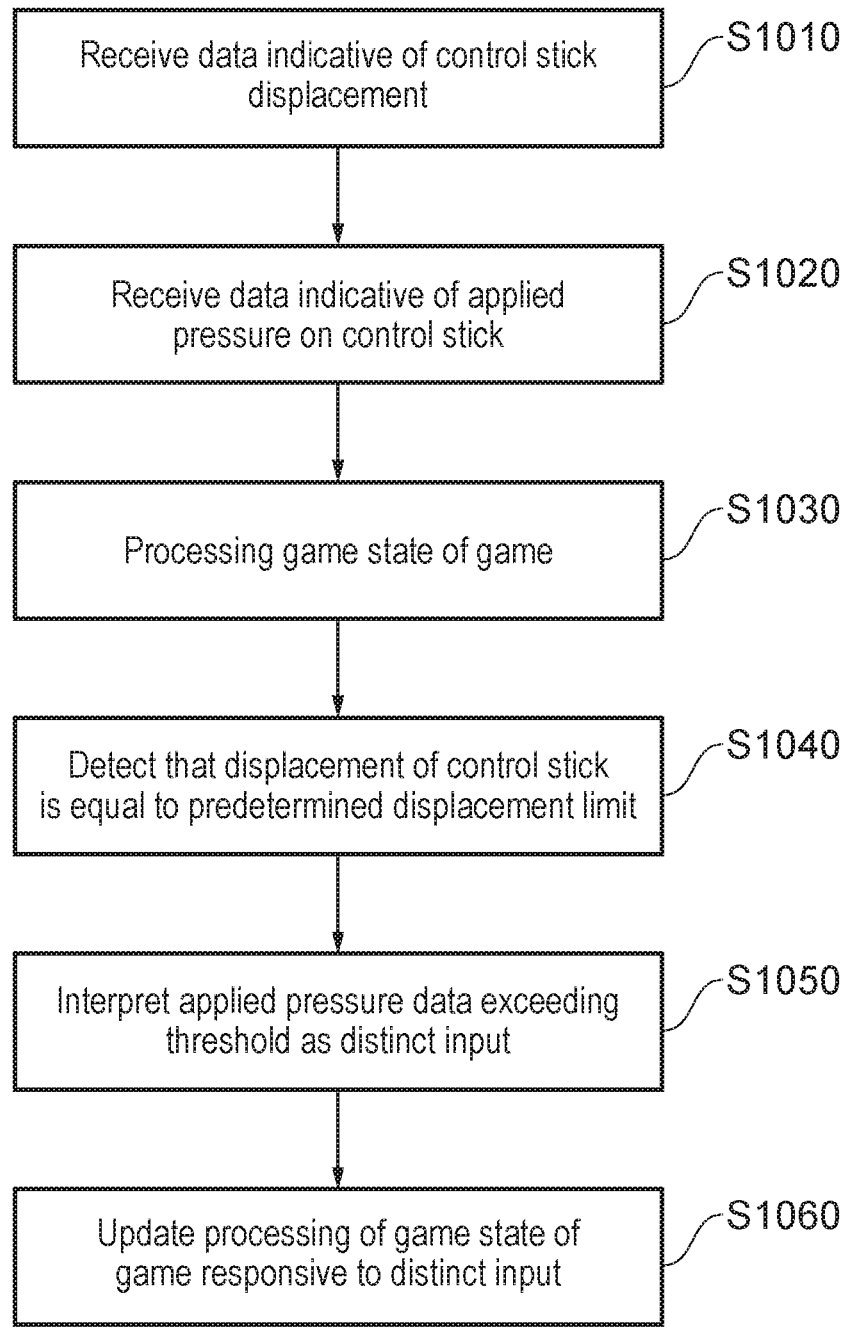
FIG. 10 is a flow diagram of a method of updating a game state of a game, in accordance with an embodiment of the present invention.

In an embodiment of the present invention, a method for receiving data from a controller and updating a game state of a game is provided. FIG. 9 is a flow diagram illustrating a method, in accordance with an embodiment of the present invention comprising:
- a first step S910 of receiving, from a controller, data indicative of a determined displacement of a control stick;
- a second step S920 of receiving, from a controller, data indicative of an applied pressure on the control stick;
- a third step S930 of processing the game state of the game; and
- a fourth step S940 of updating the processing of the game state of the game responsive to the received data indicative of the determined displacement of the control stick, and the received data indicative of the applied pressure on the control stick.

In an embodiment of the present invention, a method for updating a processing of a game state of a game comprises:
- a first step S1010 of receiving, from a controller, data indicative of a determined displacement of a control stick;
- a second step S1020 of receiving, from a controller, data indicative of an applied pressure on the control stick;
- a third step S1030 of processing the game state of the game;

a fourth step S1040 of detecting that the determined displacement of the control stick is equal to a predetermined displacement limit; and if so a fifth step S1050 of interpreting received data indicative of the applied pressure on the control stick exceeding a predetermined threshold as a distinct input; and a sixth step S1060 of updating the processing of the game state of the game responsive to that distinct input.

It will be apparent to a person skilled in the art that variations in the above method corresponding to operation of the various embodiments of the system as described and claimed herein are considered within the scope of the present invention.

It will be appreciated that the above methods may be carried out on conventional hardware (such as that described previously herein) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The invention claimed is:

1. A handheld controller, comprising: at least one control stick; one or more sensors configured to sense a pressure applied to the control stick and to generate corresponding pressure information; first circuitry configured to receive displacement information associated with a physical displacement of the control stick in a direction relative to a reference position when a pressure is applied to the control stick; second circuitry configured to receive, from one or more of the sensors, pressure information associated with the pressure applied to the control stick; and third circuitry configured to determine the displacement of the control stick and the applied pressure on the control stick, based on the received displacement information and the pressure information; wherein at least one of the one or more sensors is configured to sense the pressure applied to the control stick when the physical displacement of the control stick reaches a predetermined displacement limit for the control stick, wherein the pressure applied to the control stick is interpreted as a distinct input when the physical displacement of the control stick is equal to the predetermined displacement limit for the control stick and the pressure applied to the control stick exceeds a predetermined threshold.

2. The controller according to claim 1, wherein the one or more sensors comprise
one or more selected from the list consisting of:
a capacitance pressure sensor;
a resistance pressure sensor;
piezoresistive pressure sensor;
a piezoelectric pressure sensor;
an optical pressure sensor; and
an elastoresistive pressure sensor;
for sensing the pressure applied to the control stick and generating the corresponding pressure information.

3. The controller according to claim 2, wherein at least one of the one or more sensors is coupled to at least a portion of a stem of the control stick to sense the pressure applied when the physical displacement of the control stick reaches the predetermined displacement limit.

4. The controller according to claim 2, wherein at least one of the one or more sensors is positioned to contact a stem of the control stick when the physical displacement of the control stick reaches the predetermined displacement limit.

5. The controller according to claim 2, wherein at least one or the one or more sensors is positioned on at least a portion of a rim disposed at the predetermined displacement limit of the control stick.

6. The controller according to claim 2, wherein at least one of the one or more sensors is disposed on a top surface of the control stick.

7. The controller according to claim 6, wherein the sensor has a plurality of sensing elements either positioned across the top surface or around a perimeter of the top surface or in the centre of the top surface.

8. The controller according to claim 7, wherein the sensor is an embedded 2D sensor array.

9. The controller according to claim 1, further comprising:
a transmitter adapted to transmit data indicative of the determined displacement of the control stick, and data indicative of the determined applied pressure on the control stick.

10. An entertainment device, comprising: a receiver adapted to receive from a handheld controller comprising at least one control stick, data indicative of a determined displacement of the control stick, and data indicative of a determined applied pressure on the control stick; and a processor operable to process a game state of a game and update the processing of the game state of the game; and in which the processor is operable to update the processing of the game state of the game responsive to the received data indicative of the determined displacement of the control stick, and the received data indicative of the determined applied pressure on the control stick, wherein the processor is operable to detect that the determined displacement of the control stick is substantially equal to a predetermined displacement limit for the control stick; and if so the processor is operable to interpret the data indicative of the determined applied pressure on the control stick exceeding a predetermined threshold as a distinct input; and the processor is operable to update the processing of the game state of the game responsive to that distinct input, wherein the pressure applied to the control stick is interpreted as a distinct input when the physical displacement of the control stick is equal to the predetermined displacement limit for the control stick and the pressure applied to the control stick exceeds a predetermined threshold.

11. A computer-implemented method for receiving data from a handheld controller comprising at least one control stick and updating a game state of a game, comprising: receiving, from the handheld controller, data indicative of a determined displacement of the control stick; receiving, from the handheld controller, data indicative of an applied pressure on the control stick; processing the game state of the game; and updating the processing of the game state of the game responsive to the received data indicative of the determined displacement of the control stick, and the received data indicative of the applied pressure on the control stick, wherein updating the processing of the game state of the game includes detecting that the determined displacement of the control stick is equal to a predetermined displacement limit for the control stick; and if so interpreting received data indicative of the applied pressure on the control stick exceeding a predetermined threshold as a distinct input; and updating the processing of the game state of the game responsive to that distinct input, wherein the pressure applied to the control stick is interpreted as a distinct input when the physical displacement of the control stick is equal to the predetermined displacement limit for the control stick and the pressure applied to the control stick exceeds a predetermined threshold.

12. A non-transitory computer readable medium having stored thereon computer executable instructions adapted to cause a computer system to perform a method comprising: receiving, from a handheld controller, data indicative of a determined displacement of a control stick of the handheld controller; receiving, from the handheld controller, data indicative of an applied pressure on the control stick; processing a game state of a game; and updating the processing of the game state of the game responsive to the received data indicative of the determined displacement of the control stick, and the received data indicative of the applied pressure on the control stick, wherein updating the processing of the game state of the game includes detecting that the determined displacement of the control stick is equal to a predetermined displacement limit for the control stick; and if so interpreting received data indicative of the applied pressure on the control stick exceeding a predetermined threshold as a distinct input; and updating the processing of the game state of the game responsive to that distinct input, wherein the pressure applied to the control stick is interpreted as a distinct input when the physical displacement of the control stick is equal to the predetermined displacement limit for the control stick and the pressure applied to the control stick exceeds a predetermined threshold.

* * * * *